J. W. TUFTS AND C. L. PETERS.
ELECTRIC WARMER.
APPLICATION FILED OCT. 20, 1919.
1,376,842.
Patented May 3, 1921.
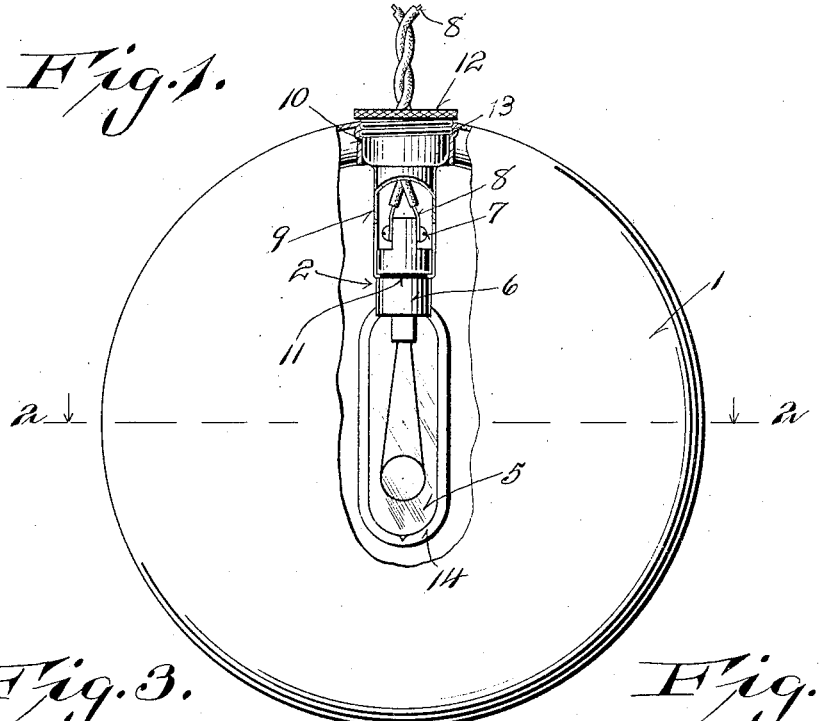
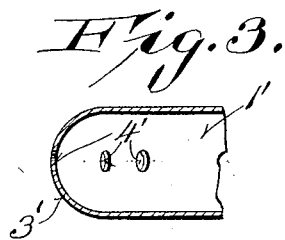
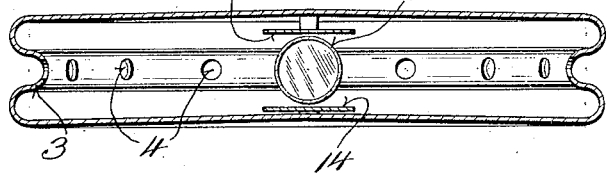
Inventors
J. W. Tufts
C. L. Peters

UNITED STATES PATENT OFFICE.

JOHN W. TUFTS, OF MILWAUKEE, AND CHARLES LOUIS PETERS, OF MARINETTE, WISCONSIN.

ELECTRIC WARMER.

1,376,842.  Specification of Letters Patent.  Patented May 3, 1921.

Application filed October 20, 1919. Serial No. 331,795.

*To all whom it may concern:*

Be it known that we, JOHN W. TUFTS and CHARLES L. PETERS, citizens of the United States, and residents of Milwaukee, in the county of Milwaukee and State of Wisconsin, and of Marinette, Marinette county, and State of Wisconsin, respectively, have invented certain new and useful Improvements in Electric Warmers; and we do hereby declare that the following is a full, clear, and exact description thereof.

Our invention refers to new and useful improvements in electrical heating appliances such as warmers for use in sick rooms and adapted for application to a patient's body as in the case of an ordinary hot water bag.

It is an object of this invention to provide an electrically controlled heating appliance which will overcome all of the disadvantages incident to the use of hot water bags or bottles and similar devices.

An additional object is to provide a heating appliance in which the heating element is readily removable, this element preferably being in the form of an ordinary incandescent lamp; such a heating element may be very cheaply replaced and will be extremely efficient in operation.

A further object is to provide an appliance of this character which includes a ventilated metallic container inclosing an incandescent electric lamp as a heating unit, whereby a certain amount of thereapeutic action may be procured in addition to the warmth radiated from the container.

Still another object is to provide a simply constructed and efficient arrangement for removably mounting the heating element within the container.

With these general objects in view, the invention consists in the novel features of construction, combination and arrangement of parts which will be hereinafter more particularly described and claimed and shown in the drawing in which—

Figure 1 represents a plan view, with parts broken away and in section of an electric heating appliance constructed in accordance with our invention.

Fig. 2 is a transverse sectional view taken substantially on the plane of the line 2—2 of Fig. 1, and Figs. 3 and 4 are fragmentary sectional views through modified forms of the container portion of the invention.

It will be appreciated as the description proceeds that the invention is capable of embodiment in various forms, this being particularly true of the shape and size of the container. It is therefore to be understood that we do not desire to be limited to the illustrated form.

However, referring more particularly to this form, it will be seen that it consists essentially of a container element 1 and a heating unit 2. The present container is circular in plan view and it has one side slightly convex and the other concave as shown in Fig. 2. The diameter of the container and the thickness thereof as defined by the concave and convex walls is such as to provide a handy article of convenient size to be readily placed where warmth or heat is most desired.

As indicated in the drawing, various peripheral edge formations of the container may be employed, the form shown in Fig. 2 having an annular peripheral groove 3 provided intermediate the opposite concave and convex sides, and in the bottom of this groove or channel is a plurality of spaced openings 4 for ventilation or other purpose. In Fig. 3 the edge of the container 1' is substantially semi-circular as at 3', and midway between the opposite sides is a series of openings 4'. Fig. 4 illustrates still a further modification of the edge, said edge in this case being substantially V-shaped as at 3'', the apex thereof having spaced openings 4''. It is obvious that by locating the openings 4 as in Fig. 2, it will be impossible for the same to be completely covered by bed covers or the like.

The heating element of the unit 2 is preferably an incandescent electric lamp 5 of proper size, the same being carried in a socket 6 of porcelain or other insulating material. One end of this socket is in the form of a connector having a pair of binding posts 7 whereby supply wires 8 for electricity may be secured thereto.

The combined socket connector is carried by the split end of a supporting sleeve 9, one end of which is preferably slightly increased in diameter and screw-threaded as at 10. The split end of the sleeve is adapted to snap over the connector portion of the socket and has an annular lip for engagement in an annular groove 11 in the socket for this purpose. In this manner the portions of the wires 8 adjacent their connections with the binding posts 7 are completely inclosed and protected by the sleeve 9, and they are insulated from the latter by being extended through a central opening in a knurled fiber disk or finger-piece 12 secured to the threaded part 10 of said sleeve.

This unit 2 including the electric lamp 5 is adapted to be inserted into the container 1 through an opening in the edge of the latter, which opening is surrounded by a threaded thimble 13, the threads thereon being engageable with the threads on the portion 10 of the sleeve as indicated in Fig. 1. The electric lamp 5 is designed to be located substantially in the center of the container, and when so positioned the only exposed portion of the heating unit will be the finger-piece 12 whereby removal of the same may be readily obtained.

Inasmuch as the thickness of the container is not particularly great and as it is more advantageous to diffuse the heat from the lamp 5, deflector plates 14 are secured to the opposite sides of said container above and below the lamp as in Fig. 2. This arrangement will prevent the portions of the container immediately adjacent the lamp from becoming excessively heated and will tend to throw the heat more evenly throughout the container.

Inasmuch as the container is hollow and entirely empty with the exception of the heating unit, and the deflector plates when used, an extremely light appliance is possible, this being especially true when the container is formed of stamped light gage sheet metal such as aluminum, which would be the case in practice. Such a warmer would therefore be extremely efficient and capable of use on parts of a person's body and in the treatment of certain diseases where a hot water bottle or other heavy device of a like nature could not be used. The advantage of using an electric lamp as a heating element is several-fold, for instance it provides a very efficient means for heating the container and one which can be inexpensively replaced should it become burned out or defective. Another advantage is that it will have more or less therapeutic action, especially when the rays of light are permitted to project through the openings in the container.

We claim:

1. A device of the class described comprising a relatively flat hollow container, an incandescent electric lamp in said container, and deflector plates interposed between the lamp and the adjacent walls of the container.

2. A device of the class described, comprising a portable hollow container having a plurality of vent apertures therein, an incandescent electric lamp disposed in said container, and being spaced from the walls thereof to provide an air space therearound, said vent apertures providing means for permitting the flow of air through the container, and a projection of light rays therefrom, portions of the wall of the container which have the apertures therein being pressed inwardly, so as to prevent the bed covers from closing said apertures, and deflector plates interposed between the lamp and the adjacent walls of the container.

3. A device of the class described comprising a relatively flat circular hollow container, having an opening in its annular wall, an electric lamp removably insertible into said container through said opening, said lamp being spaced from the walls of the container to provide an air space therearound, and deflector plates interposed between the lamp and the adjacent walls of the container.

4. A device of the class described comprising a hollow container, having an opening in one wall, the wall of said opening being screw threaded, a socket carrying sleeve removably disposed in said opening, and an incandescent electric lamp in said socket, said container having a peripheral reëntrant channel provided with a series of apertures in its bottom, heated air from the container being permitted to circulate through said apertures.

In testimony that we claim the foregoing we have hereunto set our hands at Milwaukee, in the county of Milwaukee and State of Wisconsin.

JOHN W. TUFTS.
CHARLES LOUIS PETERS.